United States Patent
Chung et al.

(10) Patent No.: US 7,896,510 B2
(45) Date of Patent: Mar. 1, 2011

(54) POLARIZED LIGHT ILLUMINATION DEVICE

(75) Inventors: Shuang-Chao Chung, Jhongli (TW); Chun-Chuan Lin, Hsinchu (TW); Hsin-Hsiang Lo, Jhudong Township, Hsinchu County (TW); Tian-Yuan Chen, Hsinchu (TW); Chih-Hsun Fan, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 355 days.

(21) Appl. No.: 12/153,765

(22) Filed: May 23, 2008

(65) Prior Publication Data

US 2009/0168393 A1 Jul. 2, 2009

(30) Foreign Application Priority Data

Dec. 31, 2007 (TW) ................ 96151632 A

(51) Int. Cl.
*F21V 9/14* (2006.01)
(52) U.S. Cl. ....................... 362/19; 359/487
(58) Field of Classification Search ............. 362/19; 359/483, 487, 488
See application file for complete search history.

(56) References Cited

U.S. PATENT DOCUMENTS

| | | | | |
|---|---|---|---|---|
| 3,233,089 A | * | 2/1966 | Levy | .............. 362/19 |
| 3,876,285 A | * | 4/1975 | Schwarzmuller | ............ 359/487 |
| 5,748,369 A | * | 5/1998 | Yokota | ................. 359/487 |
| 5,764,412 A | * | 6/1998 | Suzuki et al. | ................. 359/487 |
| 5,856,855 A | * | 1/1999 | Mol et al. | ................. 362/19 |
| 6,144,492 A | * | 11/2000 | Iwamura et al. | ............ 359/487 |
| 6,318,863 B1 | | 11/2001 | Tiao et al. | |
| 6,352,350 B1 | * | 3/2002 | Ma | ................. 362/19 |
| 6,414,438 B1 | | 7/2002 | Borisov et al. | |
| 6,464,362 B1 | | 10/2002 | Sugawara et al. | |
| 7,070,300 B2 | | 7/2006 | Harbers et al. | |
| 7,537,352 B2 | * | 5/2009 | Chen | ................. 362/19 |
| 7,543,945 B2 | * | 6/2009 | Lee et al. | ................. 362/19 |
| 2005/0063184 A1 | | 3/2005 | Lee et al. | |

FOREIGN PATENT DOCUMENTS

TW 358889 5/1999
TW I269112 12/2006

* cited by examiner

*Primary Examiner*—Alan Cariaso
(74) *Attorney, Agent, or Firm*—Rabin & Berdo, P.C.

(57) ABSTRACT

A polarized light illumination device is described, which includes a light source, a polarizer, a reflector, and a polarized light converter. The light source generates light. The reflector is used for reflecting light generated by the light source towards the polarizer. The polarizer allows a first polarized light to pass through, and reflects a second polarized light. The polarized light converter reflects the light irradiated on the polarized light converter and performs a polarization conversion. A plane where the polarized light converter is located is substantially perpendicular to the polarizer.

10 Claims, 5 Drawing Sheets

POLARIZED LIGHT ILLUMINATION DEVICE

CROSS-REFERENCE TO RELATED APPLICATIONS

This non-provisional application claims priority under 35 U.S.C. §119(a) on Patent Application No(s). 096151632 filed in Taiwan, R.O.C. on Dec. 31, 2007, the entire contents of which are hereby incorporated by reference.

BACKGROUND OF THE INVENTION

1. Field of the Invention

The present invention relates to an illumination device, and more particularly to a polarized light illumination device.

2. Related Art

Along with the enhanced light-emitting efficiency and high color performance of the light-emitting diode (LED), many projection systems taking the liquid crystal display (LCD), liquid crystal on silicon (LCoS) or digital mirror device (DMD) as an imaging device have adopted the LED as a light source for the imaging projection device, in order to achieve a better color performance and the objective of being light, thin, short, and small. Besides being applied in the above projection displays, the LED light source also becomes a main light source for the LCD under the consideration of the highly-developed LCD technique and the environmental problem caused by the cold cathode fluorescent lamp (CCFL). However, since the LCD can receive merely the light source at a unidirectional polarization state, the LCD display adopting the LED as the light source may lose ½ light energy, if the conversion and utilization of the polarization state are not taken into consideration, as a result, the quality and efficiency of the display may be greatly reduced.

U.S. Pat. No. 7,070,300 has disclosed an illumination system. In order to enhance the brightness of the illumination system, a phosphor layer is employed for wavelength conversion, so that the converted light is prevented from damaging the light source once it is incident back on the light source. However, the illumination device further requires another receiver for converting the wavelength, and thus the volume of the illumination device is increased. Moreover, since the display device is mostly in the shape of rectangle, the light of the illumination system cannot be easily modified into a rectangular shape, so as to cause unnecessary loss of light energy.

U.S. Pat. No. 6,318,863 has disclosed an illumination device and image projection apparatus including the same. The illumination device includes: a light source, as an array formed by a plurality of light-emitting modules; and an array of taper light pipes, formed by a plurality of taper light pipes, wherein each taper light pipe has a first end and a second end. The first end of the taper light pipe is tightly connected to the light-emitting module, and thus the wide angle light emitted by each light-emitting module is collected and then converted into narrow angle light. Therefore, uniform light is emitted from the second end of each taper light pipe and projected on the light valve for imaging. Under the condition of the conservation of etendue, a taper light pipe is used in this patent to reduce the light exit angle distribution, so as to uniform the lights. The light exit angle of the LED light source is an approximate lambertian distribution. In other words, the area of the light exit port of the taper light pipe must be sufficient large to reach a specific range, so as to effectively reduce the light exit angle of the light source. Therefore, since the area of the panel is limited, the number of the LEDs disposed thereon is somewhat restricted, so as to greatly reduce the efficiency of the illumination system.

U.S. Pat. No. 6,414,438 has disclosed a polarized light illumination and a projection display. The projection display converts the polarization state of light through a polarized converting element, so as to enhance the efficiency of the system. However, due to the system configuration, the incident light must be controlled at an angle within a certain range, and the polarized converting element can be used merely under a specific system configuration, and as a result, it is not suitable for other systems.

ROC Patent No. 1269112 has disclosed an optical projection device and a polarized light source module thereof. The polarized light source module includes a light source, a reflector, and an optical film with a polarized light splitter and a polarized light converting reflector. The light source provides a non-polarized light, the reflector has a curved surface, and the reflector and the optical film wrap the light source. The polarized light splitter allows the first polarized light to pass through, and reflects the second polarized light towards the polarized light converting reflector through the curved surface. The polarized light converting reflector is used to convert the second polarized light into the first polarized light for being reflected, and the first polarized light reflected by the polarized light converting reflector is reflected by the reflector and then passes through the polarized light splitter. The etendue of the polarized light source module is rather low, thus the optical projection device may has a lower manufacturing cost and a higher light utilization rate, but the volume of the polarized light source module still needs to be improved.

In view of the above, the polarized conversion module currently used in the LCD or projection system mostly adopts a spacially separated configuration, i.e., the two portions of light at different polarization directions are spacially separated and then processed separately, so as to improve the efficiency of the device. Due to the etendue, if the light from the light source is converted after being emitted to the system for a certain distance, it easily results in an enlarged system volume.

Therefore, how to provide a polarized light illumination device with a high efficiency and the characteristics of being light, thin, short, and small has become one of the problems to be solved by the researchers.

SUMMARY OF THE INVENTION

In view of the above problems, the present invention is directed to a polarized light illumination device, which utilizes a reflector to rearrange a light exit angle of the light source, and utilizes a polarized light converter to convert a polarization state in the light source into the same polarization state as the emitted light, so as to increase the brightness, reduce the volume of the illumination device, and improve the illumination efficiency.

Therefore, the present invention provides a polarized light illumination device, which includes: a light source, for generating light; a polarizer, for allowing a first polarized light to pass through, and reflecting a second polarized light in the ray of light; a reflector, for reflecting the light generated by the light source towards the polarizer; and a polarized light converter, for reflecting the light irradiated thereon and performing a polarization conversion to covert the second polarized light into the first polarized light. A plane where the polarized light converter is located is substantially perpendicular to the polarizer.

In the polarized light illumination device, the light exit angle of the light source is rearranged through a curved surface of the reflector, such that the light exit angle of the light source is not restricted, which thus is more convenient than the conventional light source with the light exit angle being controlled within a certain range. Moreover, the light source, the reflector, the polarizer, and the polarized light converter may be integrated into an illumination module, so as to reduce the efficiency loss caused by an error in the conventional design using the light pipes, such that an optical light collecting efficiency may reach up to over 85% in the present invention. Moreover, the curved surface of the reflector in the present invention merely has an approximately ¼ ellipsoidal area, so as to significantly reduce the volume of the polarized light illumination device.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

Figure 1A:
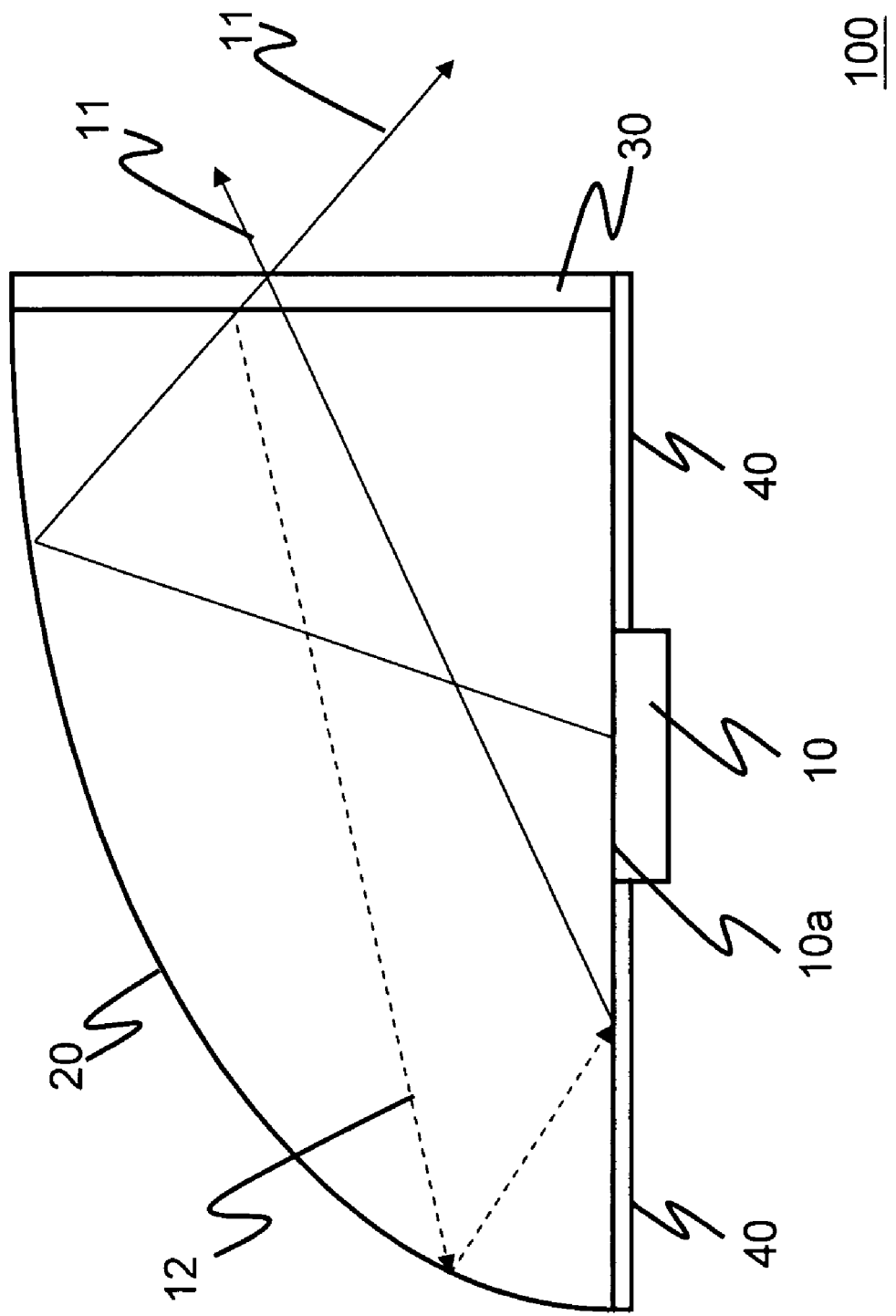
FIG. 1A is a schematic side view of a structure of a polarized light illumination device according to the present invention.

Referring to FIG. 1A, it is a schematic side view of a structure of a polarized light illumination device 100 according to the present invention. As shown in FIG. 1A, the polarized light illumination device 100 of the present invention includes a light source 10, a reflector 20, a polarizer 30, and a polarized light converter 40.

The light source 10 has a light exit surface 10a and generates light containing a first polarized light 11 and a second polarized light 12 at all angles, and the ray of light is emitted from the light exit surface 10a. The light source 10 may be formed by, for example, a single LED, a single organic LED (OLED), LEDs arranged in a matrix, or OLEDs arranged in a matrix. The light source 10 is preferably a one-side light source with a directional light emitting range, and the light source 10 may also be an omni-directional point source. The light source 10 is, for example, a red light source, a blue light source, a green light source and/or a white light source. Moreover, a heat sink fin or a heat sink device may be disposed at one side opposite to the light exit surface 10a of the light source 10, so as to improve the heat dissipation efficiency of the polarized light illumination device 100.

The reflector 20 has two ends connected one end of the polarizer 30 and one end of the polarized light converter 40 respectively. The reflector 20 is used for reflecting the ray of light emitted from the light exit surface 10a of the light source 10, and controlling the ray of light to be incident on the polarizer 30 in parallel. The reflector 20 has a curved surface. The light source 10 is preferably disposed on the focus of the curved surface, or disposed close to the focus of the curved surface. The curved surface may also be, for example, a parabolic curved surface or an elliptical curved surface. The structure of the reflector 20 includes a substrate and a mirror surface layer with a high reflectivity. The substrate may be, for example, formed by materials with a high transmittance, such as plastic or glass. The mirror surface layer with a high reflectivity may be, for example, a coating of a metal or multi-layer dielectric material. Moreover, the curved surface of the reflector 20 is an approximately ¼ ellipsoidal area, and thus the reflector 20 has a smaller volume and size than that of the convention reflector adopting a ½ spherical area.

The polarizer 30 is approximately a sheet structure with a light incident surface and a light exit surface, and the light incident surface is substantially parallel to the light exit surface. The polarizer 30 has a characteristic of allowing a specific polarized light to pass through, and reflecting the other light perpendicular to the passing polarized light in polarization direction. In other words, the polarizer 30 may allow the light to pass through or reflect the light depending upon the polarization state thereof. For example, the polarizer 30 allows the S-polarized light to pass through, and reflects the P-polarized light, or the polarizer 30 allows the P-polarized light to pass through, and reflects the S-polarized light.

The polarizer 30 is connected to the reflector 20 at one end, and connected to the polarized light converter 40 at the other end. The polarizer 30 allows the first polarized light 11 in the ray of light to pass through, and reflects the second polarized light 12 in the ray of light. The first polarized light 11 may be, for example, an S-polarized light or a P-polarized light depending upon the optical characteristics of the polarizer 30. In this embodiment, the first polarized light 11 is an S-polarized light, and the second polarized light 12 is a P-polarized light. The surface of the polarizer 30 where the first polarized light 11 is incident is approximately perpendicular to the surface of the polarized light converter 40 where the second polarized light 12 is incident.

Figure 1B:
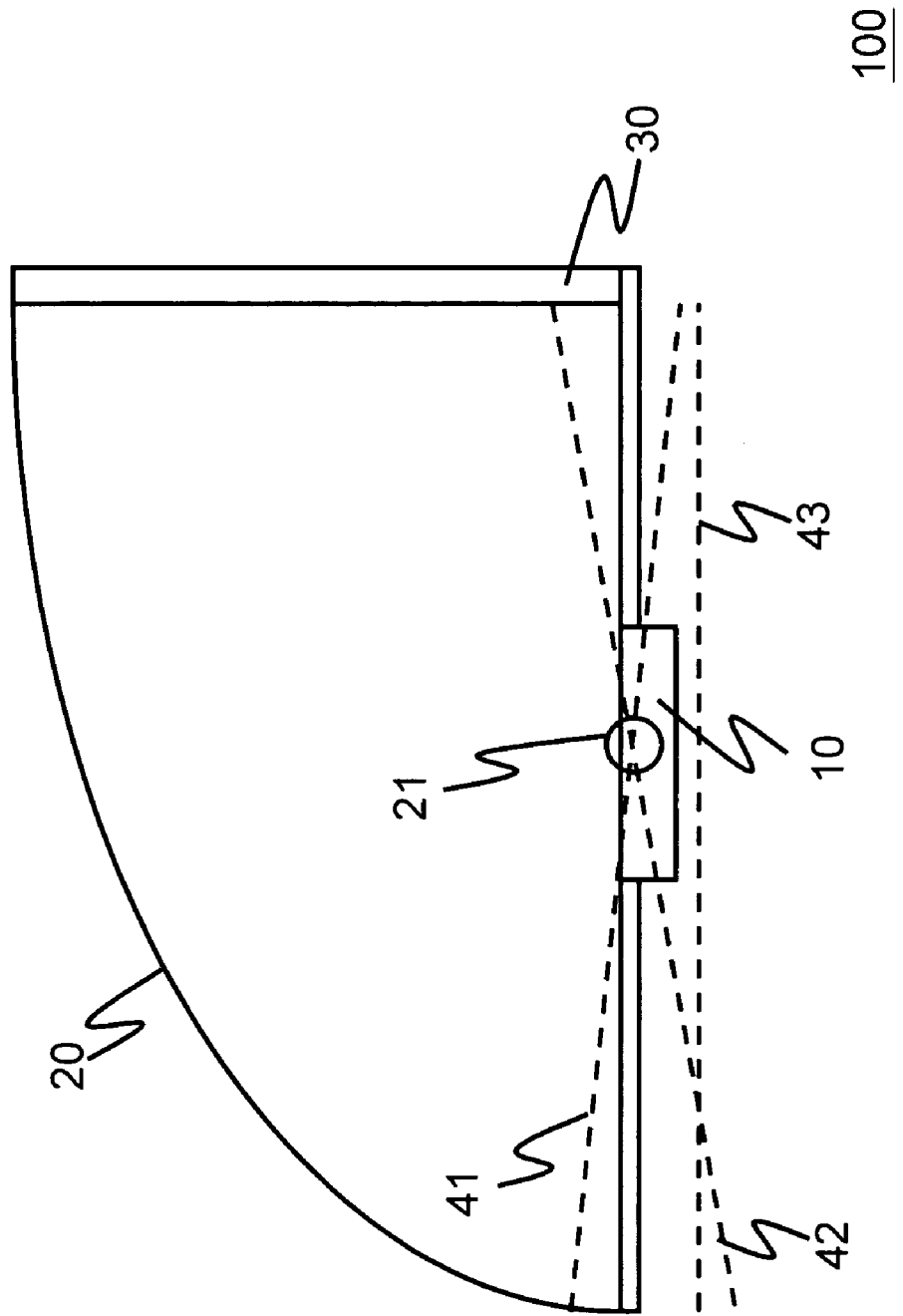
FIG. 1B is a schematic view of a plane where a polarized light converter is located substantially passing through a focus of a reflector according to the present invention.

Referring to FIG. 1B, the plane where the polarized light converter 40 is located substantially passes through the focus 21 of the reflector 20, which means that the plane (or extension plane) of the polarized light converter 40 passes the area close to the focus 21. Therefore, the plane of the polarized light converter 40 may be, for example, a first plane 41 or a second plane 42 in FIG. 1B. Moreover, the plane of the polarized light converter 40 may also substantially pass close to the focus 21 of the reflector 20. Therefore, the plane of the polarized light converter 40 may also be, for example, a third plane 43. The polarized light converter 40 may be disposed on the same plane as the light source 10, and arranged around the light source 10, i.e., the light source 10 is substantially located close to the plane of the polarized light converter 40. The polarized light converter 40 may shift a phase of the ray of light for ¼ wavelength to change the polarization state of the ray of light.

Figure 2:
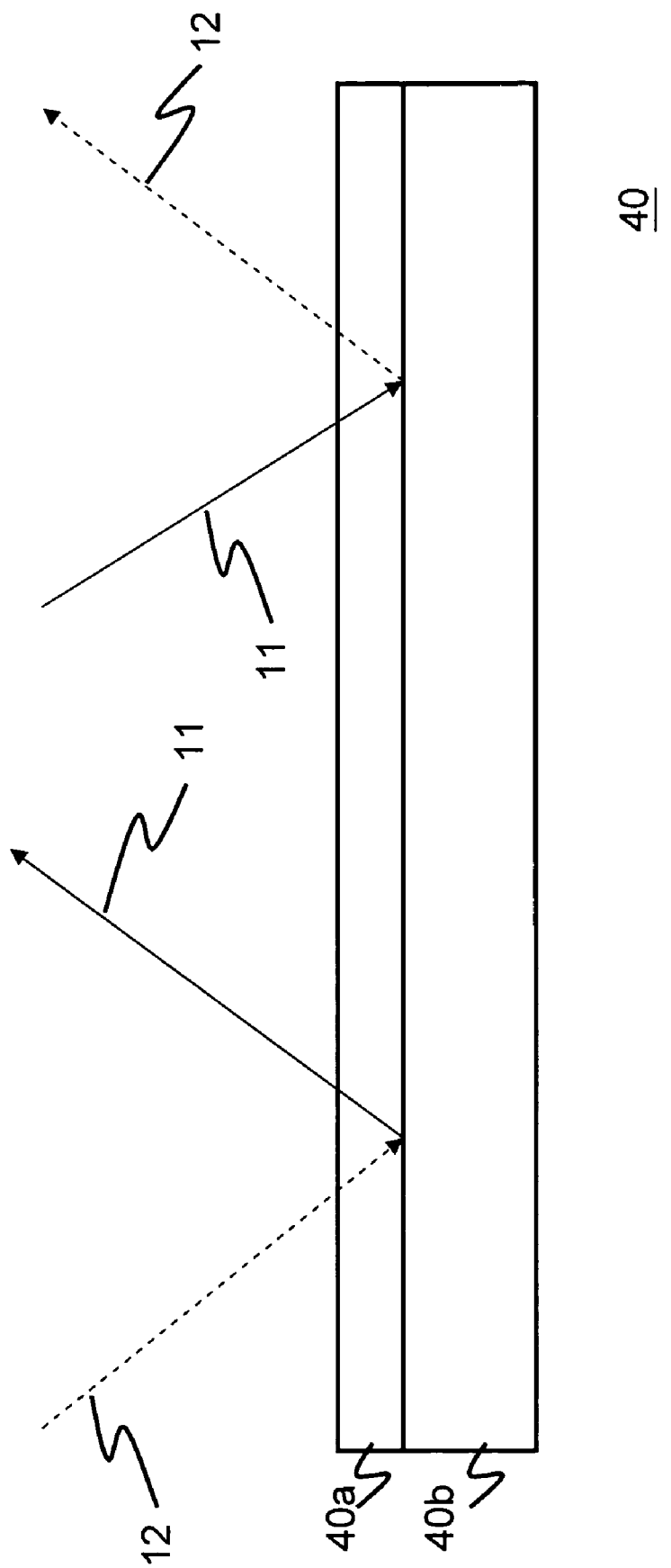
FIG. 2 is a schematic view of a ½-wave polarization conversion according to the present invention.

Moreover, the plane of the polarized light converter 40 is substantially perpendicular to the polarizer 30, which means that the surface of the polarizer 30 where the first polarized light 11 is incident is substantially perpendicular to the surface of the polarized light converter 40 where the second polarized light 12 is incident (as shown in FIG. 1A). The polarized light converter 40 is used for reflecting the light irradiated thereon and performing a polarization conversion, in which the polarization conversion may be, but not limited to, a ½-wave polarization conversion. The polarized light converter 40 may convert the second polarized light 12 into the first polarized light 11, or convert the first polarized light 11 into the second polarized light 12. The polarized light converter 40 may, for example, include a ¼ wave plate 40a and a substrate 40*b* (as shown in FIG. 2). The ¼ wave plate 40*a* is used for performing the ½-wave polarization conversion, and the substrate 40*b* is disposed on one side of the ¼ wave plate 40*a* for reflecting the light incident on the ¼ wave plate 40*a*. The substrate 40*b* may be formed by, for example, a coating of a metal or multi-layer dielectric material.

Hereinafter, the operation principle for the polarized light illumination device 100 is illustrated below. Firstly, the light source 10 generates light and emits the ray of light from the light exit surface 10*a*. The ray of light includes a first polarized light 11 and a second polarized light 12 at all angles. When the emitted ray of light is reflected by the reflector 20 and transmitted to the polarizer 30, the polarizer 30 may reflect the second polarized light 12, and emit the first polarized light 11.

Next, the second polarized light 12 is reflected by the reflector 20 and then transmitted to the polarized light converter 40 disposed around the light source 10. The second polarized light 12 is converted into the first polarized light 11 after being reflected by the polarized light converter 40, and at this time, the first polarized light 11 is reflected by the polarized light converter 40 and then transmitted to the polarizer 30, so as to be emitted. Therefore, the polarized light converter 40 is adopted to convert the second polarized light 12 into the first polarized light 11, so as to relatively increase the brightness of the polarized light illumination device 100.

Moreover, the polarized light illumination device 100 of the present invention may form an array illumination system with an array structure, which also falls within the protection scope of the present invention.

FIG. 2 is a schematic view of a ½-wave polarization conversion according to the present invention. As shown in FIG. 2, the polarized light converter 40 includes a ¼ wave plate 40*a* and a substrate 40*b*. The substrate 40*b* has a characteristic of reflecting light, which may be, for example, a mirror. When the second polarized light 12 is incident on the ¼ wave plate 40*a*, the second polarized light 12 is ¼-wavelength converted by the ¼ wave plate 40*a*. When the second polarized light 12 is transmitted to the substrate 40*b*, the substrate 40*b* reflects the second polarized light 12 to the ¼ wave plate 40*a*. Next, the second polarized light 12 is ¼-wavelength converted once again by the ¼ wave plate 40*a* to become the first polarized light 11, and then emitted from the surface of the ¼ wave plate 40*a*. The second polarized light 12 is performed with the ¼-wave polarization twice in the polarized light converter 40, in other words, the second polarized light 12*a* is ½-wave converted through the polarized light converter 40, so as to become the first polarized light 11.

Similarly, when the first polarized light 11 is incident on the ¼ wave plate 40*a* of the polarized light converter 40, the first polarized light 11 is ¼-wavelength converted by the ¼ wave plate 40*a*. When the first polarized light 11 is transmitted to the substrate 40*b*, the substrate 40*b* reflects the first polarized light 11 to the ¼ wave plate 40*a*. Next, the first polarized light 11 is ¼-wavelength converted once again through the ¼ wave plate 40*a*, so as to become the second polarized light 12, and then emitted from the surface of the ¼ wave plate 40*a*. Therefore, the first polarized light 11 may also become the second polarized light 12, after a ½-wave polarization conversion performed through the polarized light converter 40.

Figure 3A:
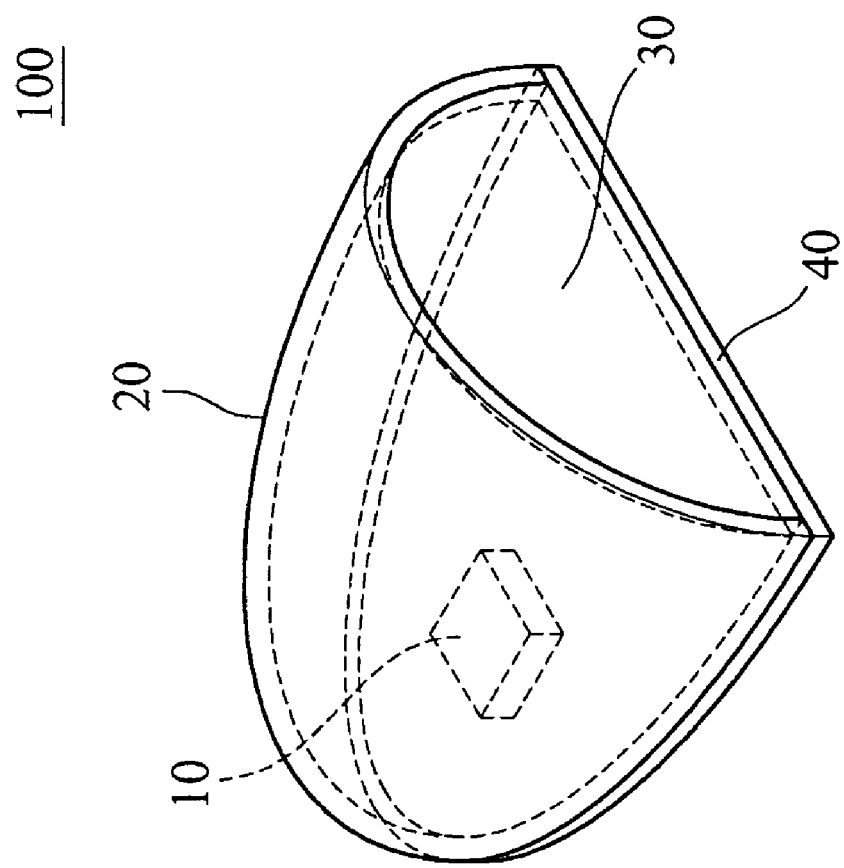
FIG. 3A is a schematic three-dimensional view of the appearance of a first embodiment of the present invention.

FIG. 3A is a schematic three-dimensional view of a first embodiment of the present invention. As shown in FIG. 3A, the light source 10, the reflector 20, the polarizer 30, and the polarized light converter 40 may be integrated into a polarized light illumination device 100, which thus has a simple fabricating process. Then, FIG. 3B is a schematic three-dimensional view of a second embodiment of the present invention.

Figure 3B:
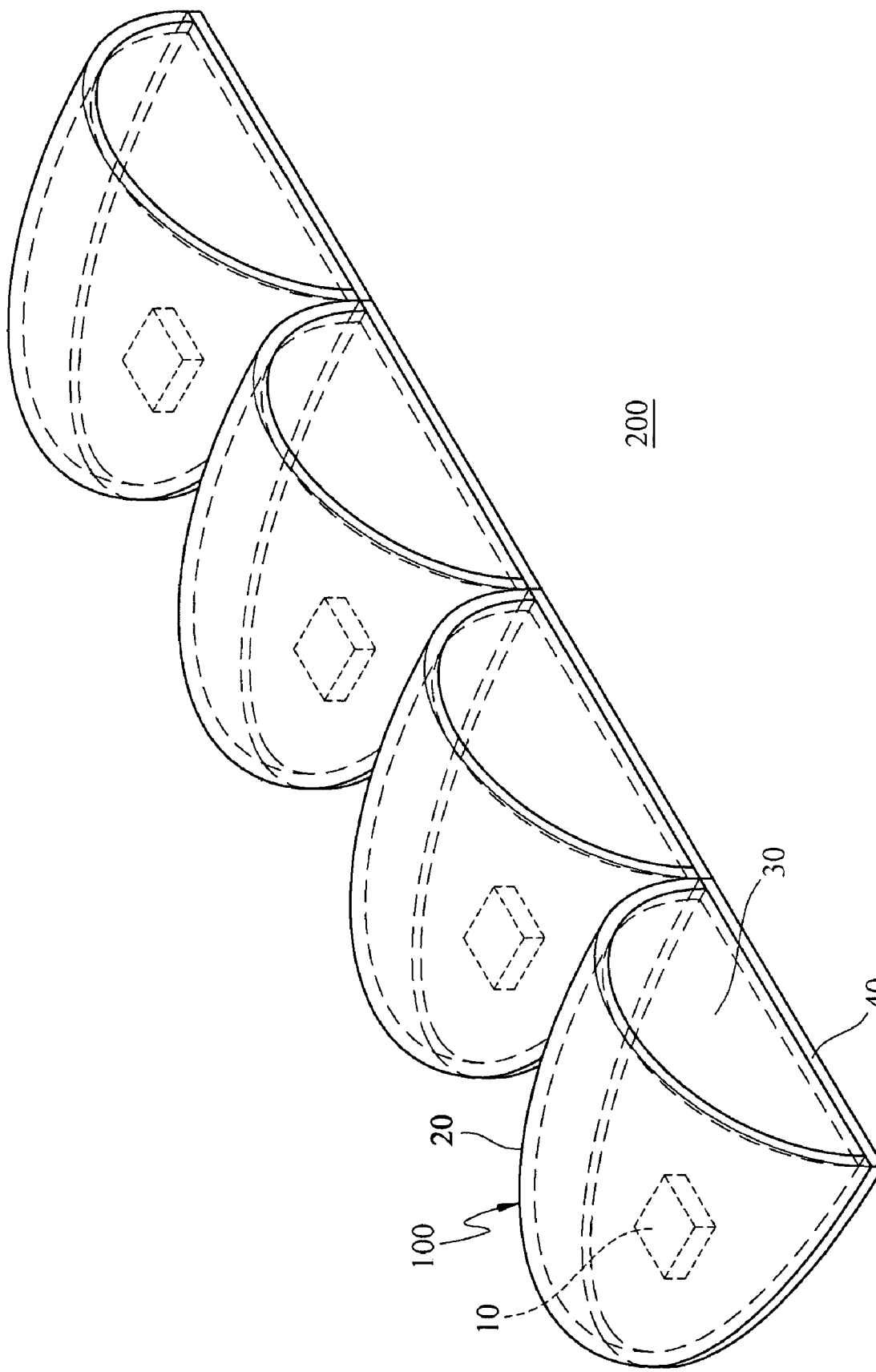
FIG. 3B is a schematic three-dimensional view of the appearance of a second embodiment of the present invention.

As shown in FIG. 3B, a plurality of polarized light illumination devices 100 may form an array polarized light illumination device 200.

Based on the above, the polarized light illumination device of the present invention utilizes the curved surface of the reflector to rearrange the light exit angle of the light source, such that the light exit angle of the light source is not restricted, which thus is more convenient than the conventional light source with the light exit angle being controlled within a certain range. Moreover, the light source, the reflector, the polarizer, and the polarized light converter may be integrated into an illumination module, so as to reduce the efficiency loss caused by an error in the conventional design using the light pipes, such that an optical light collecting efficiency may reach up to over 85% in the present invention. Moreover, the curved surface of the reflector in the present invention merely has an approximately ¼ ellipsoidal area, so as to significantly reduce the volume of the polarized light illumination device.

What is claimed is:

1. A polarized light illumination device, comprising:
    a light source used to generate a first polarized light and a second polarized light;
    a polarizer allowing the first polarized light to pass through, and reflecting the second polarized light;
    a polarized light converter substantially perpendicular to the polarizer; and
    a reflector having a curved surface, the reflector reflecting the first and second polarized light from the light source towards the polarizer, and reflecting the second polarized light, reflected by the polarizer, towards the polarized light converter, the polarized light converter converting the second polarized light to the first polarized light and reflecting the converted first polarized light towards the polarizer.

2. The polarized light illumination device according to claim 1, wherein the light source is a light-emitting diode (LED) light source.

3. The polarized light illumination device according to claim 1, wherein the light source is a one-side light source.

4. The polarized light illumination device according to claim 1, wherein the light source is disposed on a focus of the curved surface.

5. The polarized light illumination device according to claim 4, wherein the curved surface is a parabolic curved surface or an elliptical curved surface.

6. The polarized light illumination device according to claim 4, wherein a plane where the polarized light converter is located substantially passes through the focus.

7. The polarized light illumination device according to claim 1, wherein the first polarized light is S-polarized light, and the second polarized light is P-polarized light.

8. The polarized light illumination device according to claim 1, wherein the first polarized light is P-polarized light, and the second polarized light is S-polarized light.

9. The polarized light illumination device according to claim 1, wherein the polarized light converter comprises:
    a ¼ wave plate, for ¼-wavelength converting the second polarized light passing there through, so as to perform a polarization conversion; and
    a substrate, disposed at one side of the ¼ wave plate, for reflecting the second polarized light incident on the ¼ wave plate.

10. The polarized light illumination device according to claim 1, wherein the light source is substantially located on a same plane as the polarized light converter.

* * * * *